United States Patent [19]

Breuer et al.

[11] Patent Number: 5,900,455
[45] Date of Patent: May 4, 1999

[54] ELASTOSOLS, PROCESS FOR THE PREPARATION THEREOF, PROCESS FOR THE USE OF SUCH ELASTOSOLS AND PRODUCTS DERIVED FROM THEM

[75] Inventors: Olaf Kurt Breuer; Hans Ferdinand Vermeire; Caroline Rita Nicole Maes, all of Ottignies Louvain-la-Neuve, Belgium

[73] Assignee: Shell Oil Company, Houston, Tex.

[21] Appl. No.: 08/072,210

[22] Filed: Jun. 4, 1993

[30] Foreign Application Priority Data

Jun. 5, 1992 [EP] European Pat. Off. ............ 92201643

[51] Int. Cl.⁶ .............................. C08K 5/00; C08L 53/02
[52] U.S. Cl. .............................................................. 524/575
[58] Field of Search .............................. 525/314; 524/575

[56] References Cited

U.S. PATENT DOCUMENTS

| | | |
|---|---|---|
| 3,695,477 | 10/1972 | Edmonston et al. . |
| 3,827,999 | 8/1974 | Crossland ................. 524/575 |
| 3,923,678 | 12/1975 | Van Henten ............... 252/59 |
| 4,143,185 | 3/1979 | Lundberg et al. . |
| 4,199,486 | 4/1980 | Boessler ................... 525/309 |
| 4,877,566 | 10/1989 | Cha ......................... 264/118 |
| 5,143,968 | 9/1992 | Diehl ....................... 524/534 |
| 5,668,209 | 9/1997 | Ruch et al. ................ 524/555 |

FOREIGN PATENT DOCUMENTS

| | | |
|---|---|---|
| 3280784 | 11/1988 | Japan . |
| 0823404 | 4/1981 | U.S.S.R. . |
| 2168991-A | 7/1986 | United Kingdom . |
| 91/05014 | 4/1991 | WIPO . |

OTHER PUBLICATIONS

PCT Search Report.

*Primary Examiner*—Jeffrey C. Mullis

[57] ABSTRACT

An elastosol is provided by combining a finely powdered, linear or branched block copolymer of a monovinyl aromatic compound and a conjugated diene having a particle size of 800 micron or less, and a rubber compatible liquid plasticizer, wherein the weight ratio of the block copolymer to the plasticizer is in the range of from 0.1 to 10. Furthermore, there is provided a process for the preparation of an elastosol as well as a process for the preparation of a homogeneous rubbery product derived from said elastosol.

4 Claims, No Drawings

ELASTOSOLS, PROCESS FOR THE PREPARATION THEREOF, PROCESS FOR THE USE OF SUCH ELASTOSOLS AND PRODUCTS DERIVED FROM THEM

FIELD OF THE INVENTION

The present invention relates to elastosols, to a process for the preparation of such elastosols, to a process for use of these elastosols and to products derived from them.

BACKGROUND

With the term "elastosols" as used throughout this specification is meant dispersions of very fine elastomeric block copolymer particles in liquid organic media, or more specifically, in rubber compatible liquid plasticizers.

At present polyvinylchloride plastisols, i.e. dispersions of very fine PVC particles in liquid organic media, are widely used for a variety of applications, such as in the preparation of bottle cap seals, conveyor belts, carpet backing, wall-coverings, and floor-coverings. In other applications PVC plastisols are processed by means of dipping, such as in the case of industrial gloves, surgical gloves, shoes, boots and coated wire products. The shaping of products by means of roto-casting or molding, which is the reverse of dipping, is also a widely used technique. The latter method is particularly suited for the production of hollow goods, such as certain toys (balls, dolls and the like).

Since there is an increasing demand for environmental friendly products, PVC containing compositions are the subject of many discussions due to the presence of the environmentally charging element chlorine in PVC. It will be appreciated that upon disposal of PVC containing products, e.g. by incineration, toxic compounds containing chlorine may be released into the environment. Therefore, extensive research effort is put in by industry to find halogen-free alternatives for PVC. However, a significant problem is to find such alternatives which provide at least the same processing and product characteristics as the presently applied PVC plastisols.

One of the main advantages of using PVC plastisols namely, is their ability to be processed by the above mentioned inexpensive processing techniques, such as spreading, molding or roto-casting and dipping, followed by zero-shear fusion of the plastisol to form the desired product. These techniques are much more flexible and provide higher production speeds than the conventional thermoplastics processing techniques like extrusion and injection molding. Up to now not any satisfactory halogen-free alternative for PVC plastisols has been found which can be prepared and processed according to said advantageous plastisol processing techniques. Moreover, as in the present situation these techniques are widely used in the PVC-plastisol industry, it is by far preferred to develop halogen-free alternatives which can be processed (and prepared) using the existing equipment in order to keep the investment costs as low as possible.

It will be appreciated that it is a main object of the present invention to provide a halogen-free PVC alternative in the form of a dispersion and more particularly in the form of an elastosol, which can be processed by means of the presently applied plastisol techniques.

From Canadian Patent No. 1,132,283 a composition is known containing a highly oil extended conjugated diene/ vinyl aromatic radial teleblock copolymer. Said composition is prepared by dissolving the block copolymer in the oil under shear conditions, e.g. by stirring, and at an elevated temperature of 120° C. to 205° C. The radial block copolymer contains 50–95% by weight of the conjugated diene and 5–50% by weight of the monovinyl aromatic compound. Due to the relatively higher content of conjugated diene in comparison with the monovinyl aromatic compound, the radial block copolymer is highly elastic. The oil to be used preferably is a naphtenic oil as the bleeding-out of oil is most likely to occur if paraffinic oil is used. The weight ratio of polymer to oil may vary from 0.5 to 0.1, which implies that oil is always present in larger amounts than the polymer. As a result, the composition is rather soft and the complete absence of bleeding-out of oil is difficult to realize. Moreover, during the preparation of the composition, the radial teleblock copolymer must be dissolved at an elevated temperature in order to obtain a homogeneous blend eventually. The processing of such compositions prepared by this melt technique is rather difficult, as shaped articles or homogeneous films can only be prepared starting from a hot mixture. It will be appreciated that storage of the homogeneous blend is in fact impossible as homogeneity is only reached at elevated temperatures and after cooling the resulting product is too stiff to be processed any further. So after its preparation, the homogeneous blend immediately must be processed.

Hence, it would be advantageous to provide an elastosol, which is stable at room temperature and which consequently can be prepared, handled and stored at relatively low temperatures. Heating the elastosol is carried out only after the elastosol has been brought in its desired end shape.

It is therefore another object of the present invention to provide a process for the preparation of an elastosol, which process can be carried out at relatively low temperature, in order to obtain an elastosol which is stable at room temperature.

A further object of the present invention is to provide a process for the preparation of a product obtainable from said elastosol via a phase inversion process.

SUMMARY OF THE INVENTION

The present invention is an elastosol comprising a finely powdered, linear or branched block copolymer having a particle size of 800 micron or less, comprising at least one polymer block A derived predominantly from a monovinyl aromatic compound and at least one, optionally hydrogenated, polymer block B derived predominantly from a conjugated diene, wherein the content of monovinyl aromatic compound is at least 40% by weight based on the weight of the block copolymer, and a rubber compatible liquid plasticizer, wherein the weight ratio of block copolymer to plasticizer is in the range of from 0.1 to 10.

DETAILED DESCRIPTION OF THE INVENTION

With the terms "derived predominantly from a monovinyl aromatic compound" and "derived predominantly from a conjugated diene" as used throughout the present specification in connection with the composition of the polymer blocks of the block copolymer, are meant that respectively the monovinyl aromatic compound and the conjugated diene are present in the polymer block under consideration in an amount of at least 80% by weight based on said polymer block. The remaining 20% by weight or essentially less consists of conjugated diene monomer in the case of a monovinyl aromatic polymer block and of monovinyl aromatic monomer in the case of a conjugated diene polymer block. Preferably, these (co)monomers are similar to those actually incorporated in the poly(conjugated diene) and poly(monovinyl aromatic) blocks.

From British Patent Specification No. 1,125,499 a closure for containers is known comprising a shell adapted for mechanical engagement with the container and a liner in said shell for engaging and sealing the container. This liner is transparent and comprises a triblock copolymer of general configuration A-B-A with A being a poly(monovinyl aromatic) block and B an optionally hydrogenated poly (conjugated diene) block and per 100 parts by weight of said block copolymer 20 to 100 parts by weight of a mineral oil extender. The composition must be soft and elastic in order to be able to actually engage and seal a container and therefore the content of monovinyl aromatic compound can not be too high. Furthermore, the composition is prepared by mixing the block copolymer and the oil, followed by extrusion of the resulting mixture. Hence, a shear requiring technique, such as extrusion, must be applied for processing the block copolymer/oil blend according to said British patent specification. Such techniques are undesired because of the relatively expensive equipment necessary. According to the present invention this disadvantage is overcome by using an elastosol, as a result of which processing can take place via plastisol techniques which do not require shear.

From U.S. Pat. No. 4,331,581 a process for the preparation of an elastosol paste is known using three different organic solvents, such as cyclohexane and toluene (first solvent), methyl ethyl ketone (second solvent) and isopropyl alcohol (third solvent). In the final step of the disclosed process, the elastosol paste precipitates from the last added, i.e. third, solvent. Consequently, the precipitated elastosol paste still contains a substantial amount of solvent, which requires an extra process step for removing solvent, e.g. by evaporation. Such a method requiring the use of organic solvent is undesired for environmental reasons and moreover, in the presently applied plastisol techniques organic solvents are not used at all, thereby avoiding said extra solvent removal step. Therefore, the present invention provides processes for preparing elastosols and pastes derived therefrom without using any organic solvents.

It will be appreciated that the size of the block copolymer particles is very important. Small particles are necessary for obtaining a stable dispersion in the plasticizer. Moreover, if the block copolymer particles are too large, it is not possible to transfer the dispersion of block copolymer particles in the rubber compatible plasticizer into a homogeneous product. In general, a particle size of 800 micron or less will suffice, whereas a particle size of 200 micron or less is preferred. A particle size of 100 micron or less is most preferred.

In a preferred embodiment of the present invention, the monovinyl aromatic content is at least 50% by weight, whereas linear block copolymers comprising two poly (monovinyl aromatic) endblocks A and one poly(conjugated diene) block B are also preferred. The polymer blocks B may be either unhydrogenated or hydrogenated to any desired extent.

The poly(monovinyl aromatic) block A can be derived from styrene, a-methylstyrene, o-methylstyrene, p-methylstyrene, p-tert-butylstyrene, 1,3-dimethylstyrene or mixtures thereof, of which styrene is the preferred monomer. The apparent molecular weight of block A, as determined by gel permeation chromatography using polystyrene standards, can vary within wide ranges. In general, block A may have any apparent molecular weight in the range of from 5,000 to 150,000 and preferably between 8,000 and 70,000.

The poly(conjugated diene) block B can be derived from 1,3-butadiene, 2-methyl-1,3-butadiene (isoprene), 2,3-dimethyl1,3-butadiene, 1,3-pentadiene, 1,3-hexadiene or mixtures thereof, of which 1,3-butadiene and isoprene are the most preferred monomers. The number average molecular weight of the rubbery block B is primarily determined by the amount of plasticizer to be absorbed during phase-inversion from elastosol to final product. In general, any number average molecular weight within the range of from 5,000 to 300,000 may be suitable, whereas a number average molecular weight in the range of from 10,000 to 150,000 is preferred.

Basically, the rubber compatible liquid plasticizer has two functions. Firstly, it embodies a liquid medium which enables the block copolymer particles to disperse, thus forming the elastosol according to the invention. This elastosol consists of three separate phases; a first phase formed by the "hard" poly(monovinyl aromatic) domains in the block copolymer particles, a second phase formed by the "soft" poly(conjugated diene) domains of said block copolymer particles and a third phase formed by the rubber compatible liquid plasticizer. The second function of the plasticizer is that upon heating to a temperature above the glass transition temperature of the poly(monovinyl aromatic) domains it extends the rubber phase, i.e. the poly(conjugated diene) domains. After the plasticizer has been absorbed completely by the rubber phase, this rubber phase will have swollen to such an extent that it will now form the continuous phase. At temperatures above the glass transition temperature of the poly(monovinyl aromatic) domains, said domains will completely soften and upon cooling rearrange into new, interconnecting poly(monovinyl aromatic) domains. Hence, a phase inversion has occurred, as the original 2+1 phase-situation has been transformed into a 2 phase-situation; one phase consisting of the newly formed poly(monovinyl aromatic) domains and one phase formed by the plasticizer extended rubber phase. This 2 phase-situation is a homogeneous extended rubber, which remains stable after cooling down to e.g. room temperature.

The weight ratio between the block copolymer and the plasticizer is also very important. If this ratio is too high, i.e. higher than 10, the viscosity of the obtained elastosol will be too high. However, a too low ratio, i.e. lower than 0.1, will result in an extended rubber being very weak at room temperature, because the plasticizer will not be completely absorbed by the rubber phase. As a result, bleeding out of the plasticizer is likely to occur. In a preferred embodiment said weight ratio lies within the range of from 0.4 to 3.

The plasticizer to be used may be any known rubber compatible liquid plasticizer, such as a naphthenic oil, a paraffinic oil, an aromatic oil or a mixture thereof, as well as a low molecular weight polyisobutylene or polybutylene. A paraffinic oil, however, is preferred.

The elastosol according to the invention can be prepared by any suitable process for preparing dispersions with the proviso that the finally formed block copolymer particles are small enough to be dispersed in an oil. The block copolymer may be produced by any well known block polymerization or copolymerization process including the well known sequential addition of monomer techniques, incremental addition of monomer technique or coupling technique as illustrated in, for example, U.S. Pat. Nos. specifications 3,251,905; 3,390,207; 3,598,887 and 4,219,627. In order to obtain the block copolymer in a powdered form in which the individual particles all have about the same, small size, any of the presently known techniques may be applied. Examples of such techniques are dispersing under high shear and subsequent precipitation, precipitation of a true solution into a non-solvent under high-speed mixing, cryogenic milling and spray drying. Cryogenic milling and spray drying are preferred, but since the minimum obtainable particle size via cryogenic milling is about 150 micron, whereas spray drying may result in particle sizes of less than 50 micron, the technique of spray drying the block copolymer after its preparation is most preferred. Hence, the elastosol according to the invention can be prepared by a process comprising the steps of:

(a) preparing the block copolymer using conventional techniques;

(b) turning the block copolymer into particles having a particle size of less than 800 micron; and (c) dispersing the thus obtained, finely powdered block copolymer in a rubber compatible liquid plasticizer at room temperature.

The present invention also offers a process for the preparation of a homogeneous, extended rubbery product from said elastosol, which process comprises the steps of:

(a) heating the elastosol under zero-shear conditions to a temperature higher than the glass transition temperature of the polymer blocks A; and (b) cooling the resulting homogeneous mass. This process can be successfully applied for the preparation of films or in the manufacture of any other shaped article, such as gloves, boots and toys. The elastosol first is spreaded in the case of films or brought into its desired shape in the case of shaped articles, after which the above described process for fusion of the elastosol takes place. Consequently, the homogeneous films and shaped articles made from said elastosol are also embraced by the present invention.

The invention is further illustrated by the following examples without restricting the scope of the invention to these embodiments.

EXAMPLE 1

Ten (10) parts of a finely powdered styrene-butadiene-styrene block copolymer having a particle size of about 500 micron, were dispersed in 4 parts of the paraffinic oil Primol 352 (Primol is a trade mark) at room temperature. This dispersion was spreaded as a thin layer on siliconized paper. Upon heating the elastosol in an oven for 10 minutes at 200° C. followed by cooling to room temperature, a homogeneous film was obtained.

EXAMPLE 2

K-Resin 04 (K-Resin is a trade mark), an asymmetric, branched block copolymer of formula $(S—B)_n X$, with S representing a polystyrene block, B a polybutadiene block and X a polyepoxy resin and with n varying from 4 to 10, said block copolymer having a styrene content of about 70% by weight based on the total block copolymer, was spray dried. The resulting median particle size of the block copolymer particles was 16 micron. The polymer particles were dispersed in a paraffinic oil (Primol 352) by stirring, the weight ratio polymer to oil being 1:1. The dispersion was spreaded as a thin layer on siliconized paper and subsequently heated in an oven for 10 minutes at 180° C. After cooling to room temperature a homogeneous film was obtained.

What is claimed:

1. A process for preparing elastosol, comprising the steps of:

preparing a block copolymer comprising at least one polymer block A derived predominantly from a monovinyl aromatic compound and at least one, optionally hydrogenated polymer block B derived predominantly from a conjugated diene, wherein the content of monovinyl aromatic compound is at least 40% by weight based on the weight of the block copolymer, turning the block copolymer into particles having a particle size of less than 800 micron; and dispersing the block copolymer particles in an oil at room temperature;

wherein the weight ratio of the block copolymer to the oil is in the range of from 0.1 to 10.

2. The process according to claim 1, wherein the block copolymer is turned into particles by cryogenic milling or spray drying the block copolymer.

3. The process according to claim 2, wherein the block copolymer is turned into particles by spray drying the block copolymer.

4. The process according to claim 1, further comprising the steps of:

heating the dispersion of the block copolymer in the oil under zero-shear conditions to a temperature higher than the glass transition temperature of the polymer blocks A; and cooling the block copolymer and the oil to form a homogeneous film.

* * * * *